United States Patent [19] [11] 4,229,222
Schneider [45] Oct. 21, 1980

[54] EARTHEN CEMENT COMPOSITIONS FOR BUILDING MATERIALS AND PROCESS

[76] Inventor: Gordon L. Schneider, 4236 Cottage Cir. #3, Las Vegas, Nev. 89109

[21] Appl. No.: 928,798

[22] Filed: Jul. 28, 1978

[51] Int. Cl.² .............................................. C04B 43/12
[52] U.S. Cl. ........................................ 106/74; 106/81; 106/84; 106/900; 252/62
[58] Field of Search ................ 162/8; 106/74, 80, 81, 106/84, 67, 71, 72, 73, 900; 252/62; 405/264, 266; 71/64SC

[56] References Cited
U.S. PATENT DOCUMENTS

| | | | |
|---|---|---|---|
| 441,462 | 11/1890 | Barnes | 162/8 |
| 1,917,181 | 7/1933 | Ackerman | 106/71 |
| 1,925,372 | 9/1933 | Darling | 162/8 |
| 2,388,060 | 10/1945 | Hicks | 106/71 |
| 3,433,704 | 3/1969 | Hecklan | 106/73 |

*Primary Examiner*—Brian E. Hearn
*Attorney, Agent, or Firm*—Seiler & Quirk

[57] ABSTRACT

Soil compositions suitable for use as building materials and having significantly improved properties of thermal or energy conductants and energy resistance as well as improved stress, compression, bearing, sound absorbing and structural integrity characteristics comprise a soil combined with cellulose, sodium silicate, and potassium or sodium hydroxide in specific proportions. The composition may also include clay and mineral fillers, depending on the characteristics of the soil.

9 Claims, No Drawings

EARTHEN CEMENT COMPOSITIONS FOR BUILDING MATERIALS AND PROCESS

BACKGROUND OF THE INVENTION

Although it has been the standard practice of the building construction industry to utilize lumber, bricks, concrete blocks, poured concrete, lathe and plaster, drywall gypsum board, and fiberboard, as well as various insulating materials, in building homes, offices, apartments, condominiums and commercial structures, many of these materials are now in very short supply and their prices are continually escalating. Moreover, lumber resources in this country are becoming rapidly exhausted, thereby further increasing building construction costs.

For thousands of years man has built structures of soil, and even today such buildings are constructed in many countries, especially in the less industrialized areas. Usually, soils are only successfully used as construction materials where the climates are hot and dry, and where the soil consists primarily of clay, known as adobe. In cool, rainy climates, earthen building structures are only suitable when built on high, dry stone foundations to eliminate the structural deterioration caused by moisture capillarity from the underlaying soil.

Moreover, soil itself lacks necessary strength and structural characteristics for modern buildings, especially in multiple storied buildings where material stress requirements are critical.

Not only is the structural integrity of soil or earthen building materials lacking, but some improvement of the energy capacity and resistance is desirable. For example, typical adobe earthen structures have an energy capacity of 1.833 btu/144 (in$^3$) (°F) and an energy resistance of 0.154 btu/in (hr) (sq. ft.) (°F). However, a reduction in the energy capacity and increase in energy resistance so as to produce a construction material having more insulative qualities is often desirable. Such properties can be improved toward typical insulating materials which have an energy capacity of from 0.040 to 0.347 and an energy resistance of between 2.778 and 5.882. Accordingly, it is the purpose of this invention to provide an earthen or soil composition having highly desirable insulative qualities as well as structural integrity, and which is economical to produce as compared to presently used construction materials.

SUMMARY OF THE INVENTION

It is an object of the present invention to provide a relatively low cost building material composition comprising soil, cellulosic materials, sodium silicate and potassium or sodium hydroxide, which composition may be further modified by the inclusion of clay and/or mineral fillers, depending on soil characteristics. The composition has improved strength, reduced energy capacity, and increased energy resistance, and is useful in producing building materials for walls, partitions, ceilings and roofs having highly desirable energy conserving requirements for heating and cooling. These compositions also produce a fire-proof cellular insulating material that may be readily troweled, poured, sprayed or jetted into place, and used in the construction of load-bearing walls, alone, or integrated with standard structural materials as may be necessary to meet local engineering specifications and building codes. The compositions may be fabricated into blocks and dried or cured much like concrete blocks, or tapped into molds or forms with comparatively low water content to achieve maximum density and strength. The compositions of the invention may be used not only in building construction to form exterior or interior walls, floors, ceilings and roofs, but may also be used for constructing fences, patios, driveways, roads and streets. The materials of the invention when formed into the building materials, produce a construction material in which nails, screws, bolts, anchors, and other types of fasteners normally utilized with wood products may be driven, fastened, or otherwise secured. Further, the enhanced qualities of the composition include improved stress acceptance, higher bearing values, and improved sound absorbing properties. These as well as other improvements achieved by the compositions of the invention will be evident to those skilled in the art from the following detailed description.

DETAILED DESCRIPTION OF THE INVENTION

According to the invention, the present composition comprises the modification of various soils utilizing sodium silicate, cellulose, and potassium or sodium hydroxide, and other optional materials as will be described. The soil used may be from any earth source, preferably readily available from local or easily accessible sources. Accordingly, such soils include clay, i.e. soils having a relatively high clay content, silts, normally characterized by particle sizes between that of clay and sand, caliche, loam, blow sand, gravel, and the like. Usually, such enumerated soil materials are those which are found alone or combined throughout the world. The specific soil is not so important, so long as it is compounded as will be taught hereinafter, whereby lack of certain original soil characteristics may be compensated for by the inclusion of optional ingredients such as clay and/or mineral fillers, depending on the final desired properties. According to the invention, it is the intention herein not to exclude any specific soils.

The cellulose used in the compositions of the invention is preferably that derived from the wood or cotton, although many other sources such as wheat, oat, flax, and rice, straw, corn stalks and cobs, sisal, hemp, sawdust, bark, forest humus and many other sources may be utilized. The most readily available source of cellulose is from paper, particularly newspapers, magazines, wrapping paper, discarded books and the like. These materials are highly advantageous not only because of the nature of the cellulose therein, but because they are readily recycled, thereby further enhancing the economic as well as environmental considerations and preservation and reuse of natural resources. Because the cellulose derived from such sources has already been chemically treated to remove lignins, gums, starches and the like, and because the molecular size of the remaining cellulose is quite small in comparison to other above mentioned sources, these materials are ideally suited for the compositions of the present invention. Other various synthetic cellulose is usually manufactured from petroleum sources and may also be used.

The amount of cellulose used will depend on the specific and desired balance between mass and insulation to be achieved. The higher the cellulosic content, the greater the insulation value, but the lower are mass and bearing strengths. Accordingly, cellulose may be used in amounts as high as about 85%, by weight, to achieve high insulation value. However, normally a suitable balance between the mass and insulation desired will be achieved by compositions having between about 0.5% and about 20% by weight, and more preferably 1% or more and up to about 6% cellulose. Above about 6% cellulose, load bearing characteristics are significantly lowered. The addition of as much as 20% cellulose may not materially alter the thermal characteristics of the composition if moisture contents are kept at or near usual compactive optimums for that type of soil and then tamped or compacted by the use of rubber tired or steel wheeled rollers, vibratory steel rollers or plate-type vibratory compaction equipment. Yet the bearing strength of the composition after drying will be greatly increased when compared to the same composition poured into a mold or form in a liquid state. Thus, the amount of cellulose, as well as its effect on the thermal and mass characteristics may be varied, depending on the treatment of the composition in producing building structure or material.

The addition of hydroxide to the cellulose containing soil composition is an essential feature of the composition and process of the invention. The incorporation of cellulose into soils without the use of the hydroxide is of little, if any benefit. In clays, in fact, it may prove to be detrimental because it further enhances high capillary and moisture retention characteristics that such soils possess. According to the invention, potassium or sodium hydroxide, or combinations thereof, are used in sufficient quantities to raise the pH of the soil to between 12.5 and 13.5. Moreover, the presence of the hydroxide in such quantities to achieve the stated pH range is important in the composition in which sodium silicate is added, since jelling can be delayed for a substantial period of time in order to allow consolidation of the mixture in the liquid state when sodium silicate has been added. Normally, in most soils, the viscosity of the sodium silicate will increase so rapidly that it is impossible to complete the mixing process. However, with the sodium or potassium hydroxide, this problem does not occur.

The specific amount of hydroxide as well as the selection of sodium or potassium hydroxides, or mixtures thereof, depends on the type of soil being utilized. In clays, especially those with high cation exchange capacities, potassium hydroxide is preferred, and the most effective. On the other hand, in silts, sands and soils containing a high percentage of calcium such as caliche, tufa or other calcarious materials, for example, as found in Florida and the Gulf Coast, sodium hydroxide is preferred. In mixtures of soils such as loams, potassium hydroxide is more effective where clays are predominant, while sodium hydroxide is preferred where the silts or sands predominate. Potassium hydroxide is also preferred even in silts and loams as the ratio of cellulose to soil is increased, especially when 3% or more, by weight, is included in the composition or when organic material contents are high. For some soils, mixtures of potassium and sodium hydroxide may also be compounded.

The amount of hydroxide utilized in compositions of the invention for insuring proper delay in the jelling time of sodium silicate may be as low as 0.05% (dry hydroxide weight) by weight of the soil in sands, sand and gravel mixtures, or in calcarious soils. Hydroxide amounts in order to achieve a pH between 12.5 and 13.5 in clays with high cation exchange capacities may be as much as 2% by weight of the soil. Amounts required in silts and loams will be between those two extremes.

The presence of sodium silicate is also a required ingredient of the compositions of the invention. Sodium silicate is known to comprise products varying in ratio from $Na_2O.3.75SiO_2$ to $2Na_2O.SiO_2$ and with various proportions of water. The material is readily commercially available, and is added to the soil composition to achieve the desired physical properties as previously described. The amount of sodium silicate required to achieve a satisfactory product is between about 1% and 20%, by weight, based upon the use of liquid sodium silicate having a silicate:sodium oxide ratio of from 2.3:1 to 3.4:1, respectively, depending upon the type of soil utilized and the composition characteristics desired. Again, the relatively high pH of the composition, in order to effectively allow consolidation of the mixture in a liquid state similar to that of poured concrete or at a comparatively low moisture content that will permit it to be compacted or tamped into place in situ, or in forms or molds, is provided by the hydroxide, as previously stated.

Depending on the type of soil utilized in preparing the compositions of the invention, additional optional ingredients may be used to enhance the properties of the resulting compositions used in building materials. When utilizing soil materials that are deficient in the amount of cation exchange capacity, it is often difficult to achieve a proper balance between mass and insulation without the loss of adequate load bearing capacity, when dry, or satisfactory structural integrity when saturated. Soils having substantial amounts of sand such as sandy loams or blow sand, are examples of such cation exchange capacity deficient soils. These deficiencies are readily compensated for by the addition of clay, in the amounts of between about 5% and about 20%, by weight, to achieve adequate balance of properties desired. Preferred clay materials are kaolin or kaolinite clays, the former comprising a substantial amount of kaolinite. However, fire clay and other native clays found in adjacent soil areas are useful, as are bentonite or montmorillonite.

Large amounts of water are often required in order to provide liquidity necessary for pouring the compositions of the invention into molds or forms, and which results in a high degree of shrinkage. In order to reduce the shrinkage problem, where it is objectionable or otherwise undesirable, the use of mineral fillers including sand, rock, stone, flyash, perlite particles, vermiculite, and other inorganic materials including lime, cement, calcium carbonate and the like, may be utilized. Of course the specific amount of any of these mineral or inorganic fillers will depend on the amount of water required or desired, and the reduction in shrinkage to be achieved. Normally, amounts of between about 10% and about 40% by weight will be suitable, and will also materially reduce both the water and hydroxide requirements. Although rock, crushed rock, or gravel, which aggregates will pass a 3/8 inch screen are quite desirable, because of the substantially increased load bearing values, such materials may also result in some loss in the ability to use standard fasteners in the resulting compositions.

In preparing suitable building material compositions containing the ingredients as described hereinabove and proportions thereof, certain process or methods of mixing the ingredients are preferred. As previously noted, when incorporating paper as the cellulose source, and in which the paper has been soaked in water prior to its mechanical agitation, such a treatment is particularly advantageous in order to test and evaluate the composition to determine the proper ratios of hydroxide, cellulose, sodium silicate and soil. In making such an evaluation, it is particularly advantageous and preferred to add the hydroxide to the hydrous cellulose mixture and agitate the composition briefly to assure thorough mixing. Thereafter, the resulting mixture is blended into the soil and thoroughly agitated until a substantially homogeneous mixture results. However, once the proper hydroxide: cellulose ratio has been determined, better results will be obtained if the hydroxide is added to the water prior to mixing the cellulose. This is especially true where cellulose is obtained from other materials such as straw, cotton, etc. Thereafter, the sodium silicate should be added as soon as possible, preferably in an aqueous solution in which the ratio of water:sodium silicate, is at least 1:1, by weight.

The following examples are given to illustrate the compositions of the invention and improvements achieved thereby. It is to be understood that the examples are for the purpose of illustration only, and the invention is not to be necessarily limited to specific compositions thereof.

EXAMPLE 1

To 120 grams of clay having a plastic limit of 18–20 and a liquid limit of 48–50 from the Tranquillity area in the San Joaquin Valley of California was added cellulose, potassium or sodium hydroxide and sodium silicate in the amounts shown below. The source of the cellulose was discarded newspapers which were soaked in water for from 4 to 24 hours before homogenization in a blender. Enough additional water was added to the cellulose-water mixture to bring the total amount to 80 ml. A solution of either sodium or potassium hydroxide having a solids content of approximately 50% was added to the cellulose-water and the mixture was thoroughly agitated. The amount of hydroxide shown represents the dry weight of the material used. After thoroughly mixing the clay and the cellulose-hydroxide solution until it was observed that the cellulose fibers were evenly distributed throughout the mass, a standard commercial sodium silicate solution have a silicon:-sodium ratio of approximately 3.0:1, and a solids content of 38–40%, by weight, diluted further with one part of water, was added to the mixture, and again, thoroughly agitated. The composition was then poured into a six ounce polystyrene cup and allowed to gel and dehydrate under heat lamps placed at a height of 24 inches. After 24 hours, the samples were removed from the cups and placed in a standard laboratory drying oven at a temperature of 140° for 24 hours. Since the principal source of failure of earthern structures in the past has been because of the permeation of water by capillarity into the structure from below, or leakage from above, because of a faulty roof, the primary emphasis of these tests was the determination of the bearing strength of the sample being saturated for 24 hours in water. The values shown were determined by the use of a Soiltest penetrometer and are measured in tons per square foot, or kilograms per square centimeter.

| Sample # | Weight in Grams | | | Milliliters | | pH | Saturated Strength |
|---|---|---|---|---|---|---|---|
| | Cellulose | KOH | NaOH | Sodium Silicate | H$_2$O | | |
| 1 | — | — | — | 10 | 90 | — | 0 |
| 2 | — | 1.8 | — | 20 | 90 | 12.5 | 0 |
| 3 | .6 | 2.4 | — | 10 | 90 | 13.3 | 2.8 |
| 4 | .6 | — | 2.4 | 10 | 90 | 13.3 | .75 |
| 5 | 1.2 | 1.8 | — | 10 | 90 | 12.7 | 3.75 |
| 6 | 2.4 | 2.4 | — | 10 | 90 | 13.4 | 5.0 |
| 7 | 3.6 | 2.4 | — | 10 | 90 | 13.4 | 5.0 |
| 8 | 3.6 | 2.4 | — | 20 | 90 | 13.3 | 5.0 |
| 9 | 4.8 | 2.4 | — | 10 | 90 | 13.4 | 4.5 |
| 10 | 6.0 | 2.4 | — | 10 | 90 | 13.4 | 2.75 |
| 11 | 6.0 | 2.8 | — | 10 | 90 | 13.5 | 1.9 |

EXAMPLE 2

To sixteen ounces of clay from the same source as Example 1 was added cellulose, potassium hydroxide and sodium silicate in the amounts shown in the table below. The procedures followed were the same as those described in Example 1 except that a standard laboratory mixer, (Hobart) was used for mixing Samples 1 and 2 instead of mixing by hand. In addition, because of the low moisture content, a Cincinatti laboratory type mix-muller was utilized for mixing Samples 3 and 4. The compositions represented by Samples 1 and 2 were liquid enough to be placed into standard 2 inch compaction cylinders and could be consolidated by agitation with a stirring rod and rapping the mold and base sharply upon the work table. The compositions represented by Samples 3 and 4 were allowed to dehydrate to approximate compaction optimums and then compacted in a Soiltest Ap-170B compression testing machine to form standard 2 inch by 4 inch test specimens. After thorough drying, two specimens each from Samples 1, 2, 3 and 4, were subjected to standard unconfined compression testing methods. The values shown are in pounds per square inch and represent an average of the two readings obtained from the two specimens of each sample.

| Sample # | Weight in Grams | | | Milliliters | | pH | Dry Compression Strength |
|---|---|---|---|---|---|---|---|
| | Cellulose | KOH | NaOH | Sodium Silicate | H$_2$O | | |
| 1 | 10.0 | 9.5 | — | 40 | 360 | 13.2 | 125# |
| 2 | 10.0 | 9.5 | — | 80 | 360 | " | 220# |
| 3 | 10.0 | 9.5 | — | 40 | 180 | 13.3 | 1087# |
| 4 | 10.0 | 9.5 | — | 80 | 180 | " | 1377# |

EXAMPLE 3

A highly organic silt from a location near Watsonville, Calif., was utilized as the soil. The Procedures followed and amounts used were the same as in Example 1.

| Sample # | Weight in Grams | | | Milliters | | pH | Saturated Strength |
|---|---|---|---|---|---|---|---|
| | Cellulose | KOH | NaOH | Sodium Silicate | H$_2$O | | |
| 1 | — | — | — | 10 | 50 | — | 0 |
| 2 | 1.2 | .9 | — | 5 | 50 | 12.5 | 1.7 |
| 3 | 1.2 | — | .9 | 5 | 50 | 12.7 | 3.0 |
| 4 | 2.4 | 1.4 | — | 5 | 50 | 12.7 | 4.5 |
| 5 | 2.4 | — | 1.4 | 5 | 50 | 12.9 | 5.0 |
| 6 | 3.6 | 1.4 | — | 5 | 50 | 12.7 | 5.0 |

-continued

| Sample # | Weight in Grams | | | Milliliters | | pH | Saturated Strength |
|---|---|---|---|---|---|---|---|
| | Cellulose | KOH | NaOH | Sodium Silicate | H₂O | | |
| 7 | 4.8 | — | 1.4 | 5 | 50 | 12.9 | 5.0 |

EXAMPLE 4

Sixteen ounces of silt from the same source as referred to in Example 3 were utilized in this series of experiments. The procedures followed were identical with Example 2, with the following results:

| Sample # | Weight in Grams | | | Milliliters | | pH | Dry Compression Strength |
|---|---|---|---|---|---|---|---|
| | Cellulose | KOH | NaOH | Sodium Silicate | H₂O | | |
| 1 | 10.0 | — | 3.6 | 20 | 200 | 12.7 | 252# |
| 2 | 10.0 | — | 3.6 | 40 | 200 | 12.8 | 377# |
| 3 | 10.0 | — | 3.6 | 20 | 100 | 12.7 | 875# |
| 4 | 10.0 | — | 3.6 | 40 | 100 | 12.9 | 1110# |

EXAMPLE 5

Caliche from the Las Vegas, Nevada, area was utilized. The procedures followed and amounts used were identical with Example 1.

| Sample # | Weight in Grams | | | Milliliters | | pH | Saturated Strength |
|---|---|---|---|---|---|---|---|
| | Cellulose | KOH | NaOH | Sodium Silicate | H₂O | | |
| 1 | — | — | — | 10 | 40 | — | 4.5 |
| 2 | — | .5 | — | 5 | 40 | 12.7 | 4.5 |
| 3 | — | — | .5 | 5 | 40 | 12.8 | 5.0 |
| 4 | 1.2 | — | .9 | 5 | 40 | 13.3 | 5.0 |
| 5 | 2.4 | — | .9 | 5 | 40 | 13.2 | 5.0 |
| 6 | 3.6 | — | .9 | 5 | 40 | 13.1 | 5.0 |

EXAMPLE 6

Caliche from the same source as in Example 5 was utilized. The procedures followed were identical with Example 2.

| Sample # | Weight in Grams | | | Milliliters | | pH | Dry Compression Strength |
|---|---|---|---|---|---|---|---|
| | Cellulose | KOH | NaOH | Sodium Silicate | H₂O | | |
| 1 | — | — | — | 20 | 160 | — | 0 |
| 2 | — | — | — | 40 | 160 | — | 0 |
| 3 | — | — | 3.75 | 20 | 160 | 13.0 | 25# |
| 4 | — | — | 3.75 | 40 | 160 | 13.1 | 47# |
| 5 | 10 | — | 3.75 | 20 | 160 | 13.0 | 159# |
| 6 | 10 | — | 3.75 | 40 | 160 | 13.1 | 217# |
| 7 | 10 | — | 3.75 | 20 | 80 | 13.2 | 610# |
| 8 | 10 | — | 3.75 | 40 | 80 | 13.2 | 804# |

EXAMPLE 7

Blow sand from the Eldorado Dry Lake area near Boulder City, Nev., was utilized. The procedures that were followed were identical with Example 1.

| Sample # | Weight in Grams | | | Milliliters | | pH | Saturated Strength |
|---|---|---|---|---|---|---|---|
| | Cellulose | Kaolin | NaOH | Sodium Silicate | H₂O | | |
| 1 | — | — | .5 | 10 | 30 | 12.6 | 0 |
| 2 | 1.2 | — | .5 | 10 | 30 | 12.6 | 2.2 |
| 3 | 1.2 | 5 | .5 | 10 | 30 | 12.6 | 2.5 |
| 4 | 1.2 | 10 | .9 | 10 | 40 | 12.8 | 3.75 |
| 5 | 1.2 | 20 | 1.8 | 10 | 50 | 13.0 | 4.5 |
| 6 | 2.4 | 30 | 2.4 | 10 | 60 | 13.3 | 5.0 |

EXAMPLE 8

Blow sand from the same source as in Example 7 was utilized. The procedures followed were identical with Example 2.

| Sample # | Weight in Grams | | | Milliliters | | pH | Dry Compression Strength |
|---|---|---|---|---|---|---|---|
| | Cellulose | Kaolin | NaOH | Sodium Silicate | H₂O | | |
| 1 | 10 | 20 | 2.0 | 40 | 120 | 12.7 | 87# |
| 2 | 10 | 40 | 3.6 | 40 | 160 | 12.9 | 111# |
| 3 | 10 | 80 | 5.0 | 40 | 200 | 13.0 | 122# |
| 4 | 10 | 120 | 7.5 | 40 | 240 | 13.3 | 136# |
| 5 | 10 | 80 | 5.0 | 40 | 100 | 13.2 | 446# |
| 6 | 10 | 120 | 7.5 | 40 | 120 | 13.4 | 587# |

EXAMPLE 9

Samples were selected from Examples 1, 3, 5 and 7 for the purpose of determining the degree to which standard fasteners usually associated with wooden construction could be used with the various compositions. It was found that nails could be driven into the clay, silt and caliche compositions that contained from 0.5% (0.6 grams) to 2% (2.4 grams) cellulose and that the average holding power appeared to be approximately that of white pine while being withdrawn by force. Samples 5 and 6 of the sand composition of Example 7 demonstrated somewhat the same characteristics. Although compositions of clay, silt and caliche containing from 3% to 4% cellulose (3.6–4.8 grams) did not retain standard nails as well as the composition with lower cellulose content, screws inserted into them were firmly embedded and could support a load of some magnitude. Expansive or expanding type of anchor fittings were found necessary in compositions containing 5% (6.0 grams) cellulose but they, like the screws in the 3–4% category were capable of supporting a load as adequately as standard gypsum board, for example.

EXAMPLE 10

In order to determine if the soil-cellulose composition encompassed by this invention might be used in the same manner as plaster applied with a trowel or sprayed with special equipment in the same manner as chemically treated, fire retardant cellulose, various soil-cellulose compositions containing from 2% to 5% cellulose including clay, silt and caliche were applied to vertical surfaces of concrete and previously cast flat sections of the compositions described herein. The compositions were applied onto a vertical surface in thicknesses up to ¼ inch or more with a trowel. In addition, after drying, the various compositions were thoroughly bonded in the same manner as plaster or cellulose insulation. While the high calcium content of the caliche appeared to make it more amenable for this purpose, the silt and clay compositions appeared to be completely adequate for the purpose.

The above examples illustrate improvements of the compositions of the invention as described herein. By utilizing such compositions, buildings may be constructed which have improved energy reducing requirements for both heating and cooling as compared to present structures, especially when considered on a cost of construction standpoint. Such an advantage of the compositions of this invention in reducing construction costs will become even more evident in view of the substantially increased cost of presently used construction materials, as previously mentioned. Moreover, with the selection of mass and insulation characteristics of compositions of the present invention, there will be provided materials which will have approximately a twelve hour average time lag in the flow of heat through walls and roof. With such composition characteristics, heating and cooling requirements may be minimized, and in certain areas, heating or cooling may not be required throughout much of the year. For example, with a right combination of insulation and mass, it is possible to store or delay heat created or caused by the sun's energy within the walls and/or roof of the building structure, which then permeates into the building interior during the night when required, or to delay the directive to outside air temperatures when they fall below the temperature level of the structure. Utilizing such a procedure and composition characteristics to greatest advantage, substantial heating and cooling energy requirements and costs can be achieved. In addition, methods of construction utilizing compositions of the invention may include utilizing such materials compatibly with the native soil surrounding the structure to achieve even further benefits. For example, the buildings may be submerged into the native earth whereby even greater energy savings may be realized. Such an advantage is especially noteworthy considering the "ballast" effect present in the earth, especially at depths of from 3 to 12 feet or more from the nominal earth surface adjacent the construction area. Further, one face of the building structure composed of the compositions of the invention may be used for cooling the interior of the building where the composition is wetted, especially desirable during periods of high ambient temperatures. With such an advantage, it would be desirable to waterproof one side or the other of the material, or both, utilizing material such as water soluble emulsions, latexes, polyvinyls, etc. for waterproofing the compositions. Utilizing such materials, it is possible to produce a structure that is waterproof throughout or on both faces, but which is subject to permeation of water internally without loss of structural integrity so that thermal conductance may be controlled as desired. These as well as other modifications and advantages of the invention will be evident to those skilled in the art.

I claim:

1. A process for producing an improved earthen composition comprising:
    (a) preparing an aqueous hydroxide solution selected from the group consisting of sodium hydroxide, potassium hydroxide, and mixtures thereof,
    (b) adding cellulose to said aqueous hydroxide solution and agitating the mixture to separate cellulose fibers throughout the mixture,
    (c) blending the product of (b) with soil until a substantially homogeneous mixture is achieved having a pH of between about 12.5 and 13.5,
    (d) adding and mixing sodium silicate to said mixture of (c), and
    (e) drying the resulting composition.

2. The process of claim 1 wherein said sodium silicate comprises between about 1% and about 20% by weight of the composition.

3. The process of claim 1 wherein said cellulose comprises between about 0.5% and about 20%, by weight of the composition.

4. The process of claim 1 wherein the amount of hydroxide is between about 0.05% and about 2% by weight of the composition.

5. The process of claim 1 wherein said soil is selected from the group consisting of clay, silt, caliche, loam, gravel and sand.

6. The process of claim 1 wherein said soil comprises sand and said composition includes between about 5 and about 20% by weight clay.

7. The process of claim 6 wherein said clay comprises kaolin or kaolinite.

8. The process of claim 1 including adding up to 40%, by weight, mineral filler.

9. The process of claim 1 including adding sufficient water to provide a pourable composition.

* * * * *